(12) United States Patent
Leimone et al.

(10) Patent No.: US 11,478,094 B1
(45) Date of Patent: Oct. 25, 2022

(54) DOUBLE-WALLED BEVERAGE CONTAINER AND METHOD OF FORMING THE SAME

(71) Applicant: Pacific Market International, LLC, Seattle, WA (US)

(72) Inventors: John Paul Leimone, Oakland, CA (US); Myron Wang, Shanghai (CN)

(73) Assignee: Pacific Market International, LLC, Seattle, WA (US)

(*) Notice: Subject to any disclaimer, the term of this patent is extended or adjusted under 35 U.S.C. 154(b) by 0 days.

(21) Appl. No.: 17/327,583

(22) Filed: May 21, 2021

(51) Int. Cl.
  *A47G 19/22* (2006.01)
  *C03C 27/10* (2006.01)
  *A47J 41/00* (2006.01)

(52) U.S. Cl.
  CPC ...... *A47G 19/2288* (2013.01); *A47J 41/0077* (2013.01); *C03C 27/10* (2013.01)

(58) Field of Classification Search
  CPC ... A47G 19/2288; A47J 41/0077; A47J 41/00; A47J 41/0055; A47J 41/0072; C03C 27/10; B65D 81/38; B65D 81/3865; B65D 81/3869; B65D 81/3872; B65D 81/3874; B65D 13/02
  See application file for complete search history.

(56) References Cited

U.S. PATENT DOCUMENTS

| | | | | |
|---|---|---|---|---|
| 9,750,360 | B2* | 9/2017 | Price ................... | A47G 19/2288 |
| 2016/0192797 | A1* | 7/2016 | Yang ...................... | B65D 53/02 |
| | | | | 220/592.17 |
| 2018/0116433 | A1* | 5/2018 | Smaldone .......... | B65D 81/3869 |
| 2019/0039812 | A1* | 2/2019 | Khomenko ........ | B65D 81/3874 |
| 2020/0017278 | A1* | 1/2020 | Leimone ............... | B65D 13/02 |

* cited by examiner

*Primary Examiner* — Don M Anderson
(74) *Attorney, Agent, or Firm* — Merchant and Gould P.C.

(57) ABSTRACT

A glass double-walled beverage container, having an inner body sidewall lower end portion in fluid-tight engagement with an inner body end wall to define an interior beverage cavity, an outer body sidewall lower end portion in fluid-tight engagement with an outer body end wall, the outer body sidewall extending fully about the inner body sidewall, an inner body sidewall upper end portion and an outer body sidewall upper end portion being rigidly connected together and in fluid-tight engagement, the inner body end wall being positioned above and spaced apart from the outer body end wall to provide an interior space therebetween, and a non-glass adhesive material positioned in the interior space adhered to both the inner and outer body end walls. A method of making same is provided.

23 Claims, 7 Drawing Sheets

DOUBLE-WALLED BEVERAGE CONTAINER AND METHOD OF FORMING THE SAME

BACKGROUND OF THE INVENTION

Field of the Invention

The present invention is directed generally to beverage containers and methods of forming them, and more particularly to glass double-walled beverage containers (e.g., glass double-walled mugs).

Description of the Related Art

Glass double-walled beverage containers typically have a glass outer shell, which receives a glass inner shell, with the inner and outer shells attached together at their top edges, such as by welding. However, such prior art glass double-wall beverage containers are prone to breakage from impact stress.

BRIEF DESCRIPTION OF THE SEVERAL VIEWS OF THE DRAWING(S)

Figure 1:
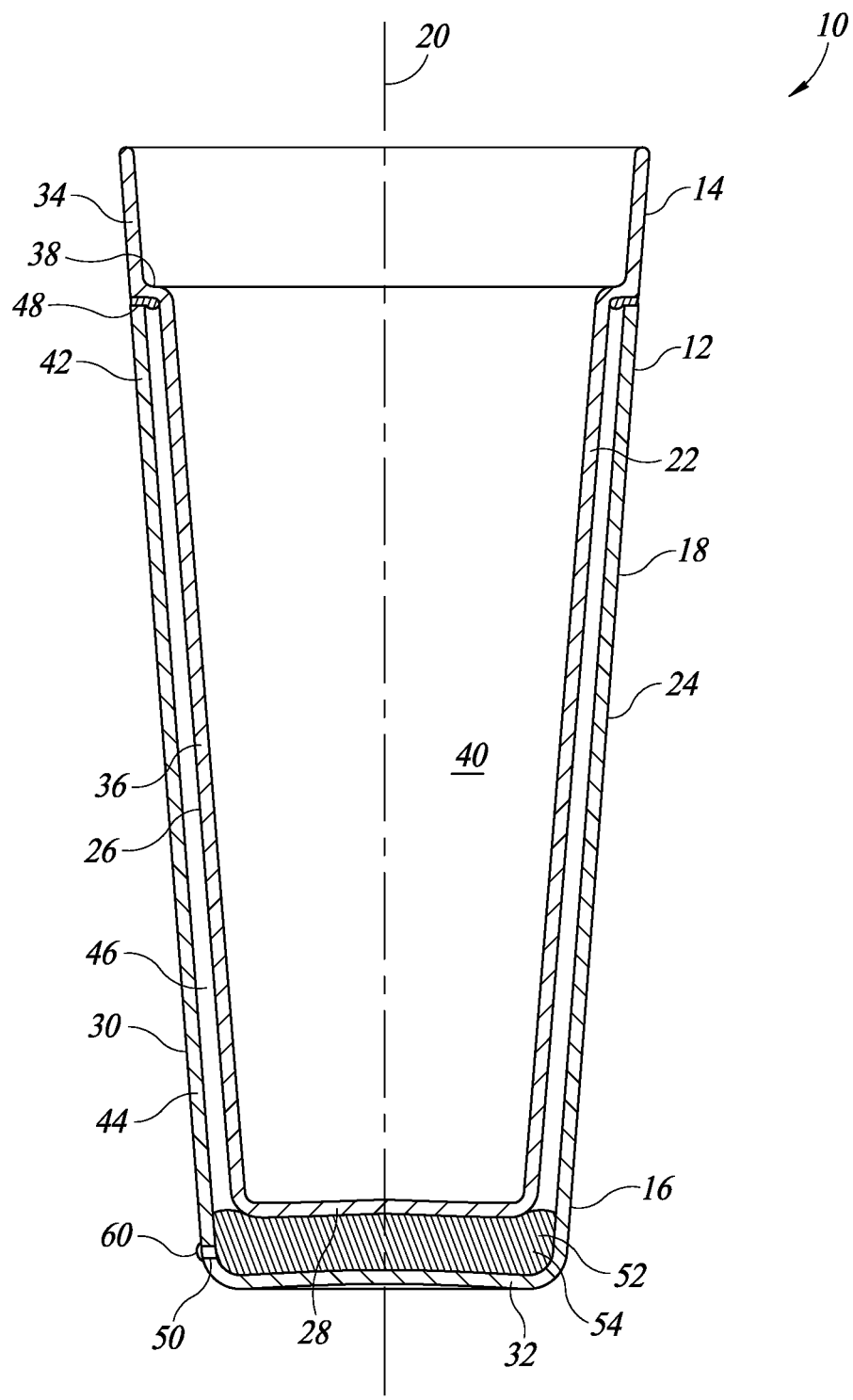
FIG. 1 is a side elevational, cross-sectional view of a fully assembled glass double-walled beverage container according to the present invention.
Figure 4:
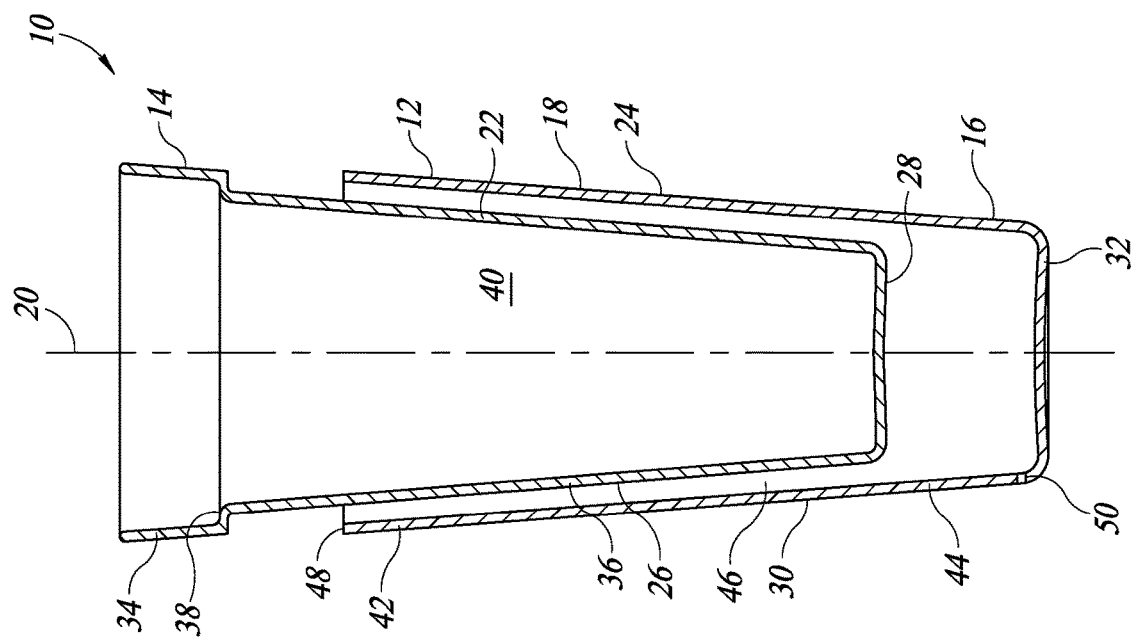
FIG. 4 is a side elevational, cross-sectional view of the glass inner shell positioned within the glass outer shell with an upper portion of the inner shell welded to an upper portion of the outer shell in accordance with the method of forming the glass double-wall beverage container of FIG. 1.
Figure 5:
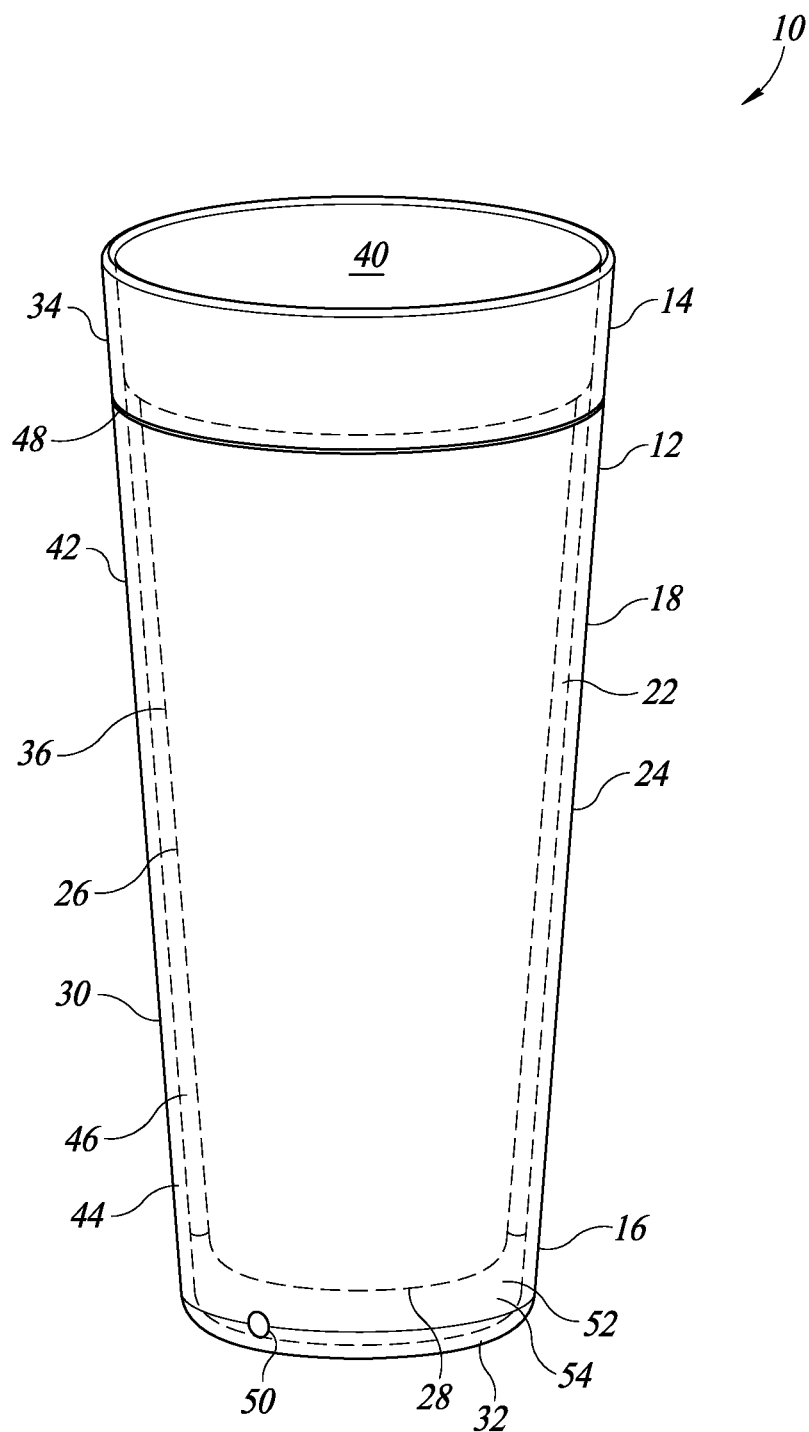
FIG. 5 is a perspective view of the welded together glass inner and outer shells of FIG. 4, showing a side vent hole in the glass outer shell.
Figure 6:
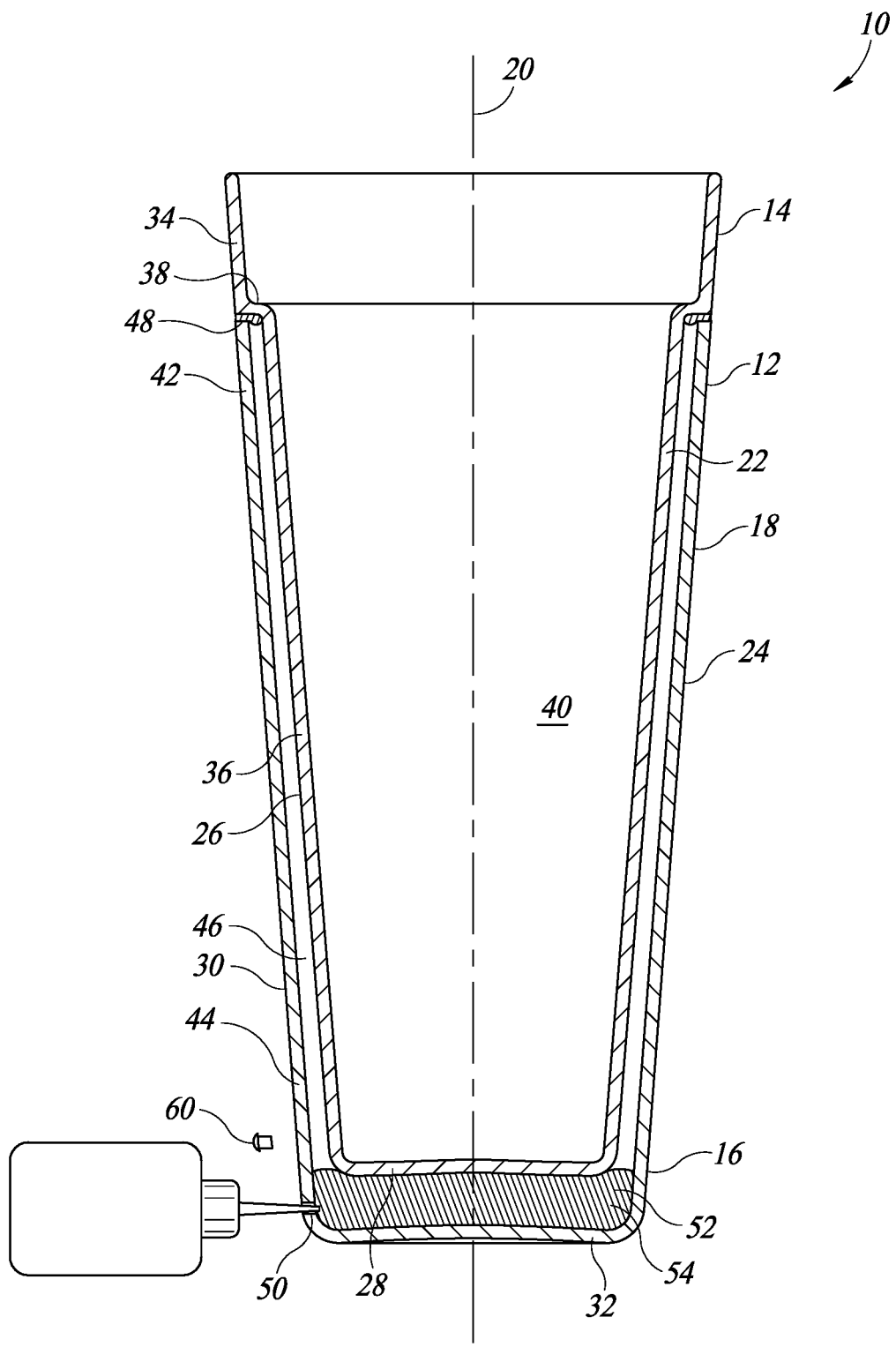

FIG. 6 is a side elevational, cross-sectional view of the welded together glass inner and outer shells of FIGS. 4 and 5, with a glue, resin or other suitable adhesive material being injected through the vent hole in the glass outer shell sufficient to fill a gap between the bottom walls of the glass inner and outer shells in accordance with the method of forming the glass double-wall beverage container of FIG. 1.

Figure 7:
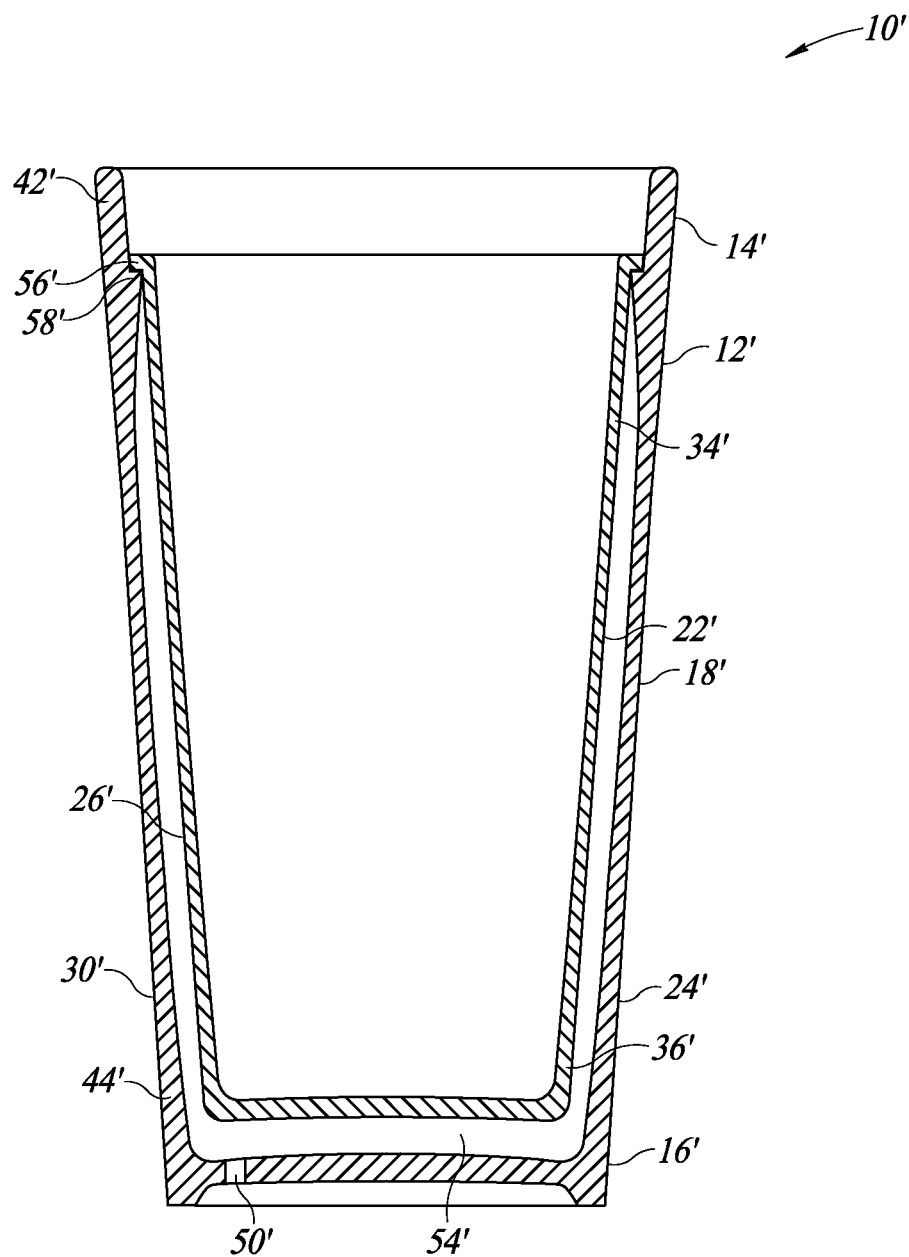

FIG. 7 is a side elevational, cross-sectional view of alternative glass inner and outer shells, with the glass inner shell positioned within the glass outer shell.

Figure 8:
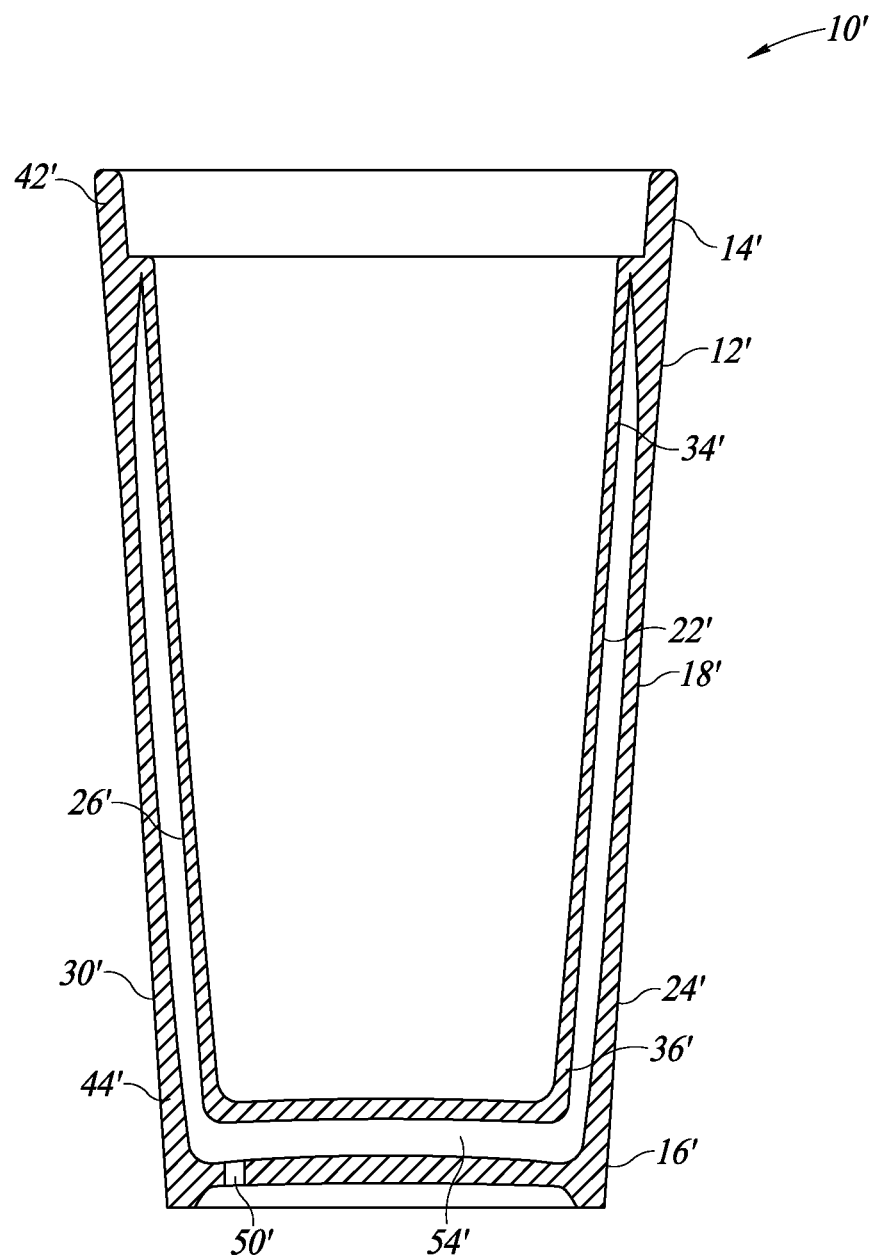

FIG. 8 is a side elevational, cross-sectional view of the alternative glass inner and outer shells of FIG. 7, with an upper portion of the inner shell welded to an upper portion of the outer shell.

Like reference numerals have been used in the figures to identify like components.

DETAILED DESCRIPTION OF THE INVENTION

FIG. 1 shows, by way of a non-limiting example of the present invention, a side elevational, cross-sectional view of a fully assembled glass double-walled beverage container 10 according to the present invention, manufactured according to an inventive method of forming the beverage container. The beverage container 10 has a body 12 with a downwardly tapering profile, with an upper end portion 14 wider than a lower end portion 16 and a mid-portion 18 extending therebetween. If desired, the beverage container 10 may be constructed with a substantially cylindrical body. The illustrated beverage container 10 has no handle or lid, but other forms of the beverage container may include a handle and/or a lid.

The body 12 is elongated and has a vertically oriented central axis 20. As shown in FIG. 1, the body 12 has a double-walled construction, with a glass inner shell or body 22 and glass outer shell or body 24. The inner body 22 has an inner body sidewall 26 and an inner body end wall 28, and the outer body 24 has an outer body sidewall 30 and an outer body end wall 32. The inner body sidewall 26 and the outer body sidewall 30 extend fully and symmetrical about the longitudinal axis 20.

The inner body sidewall 26 has an upper sidewall portion 34, a lower sidewall portion 36, and a shoulder sidewall portion 38 extending laterally between a lower end portion of the upper sidewall portion 34 and an upper end portion of the lower sidewall portion 36. The inner body end wall 28 is in fluid-tight engagement with a lower end portion of the lower sidewall portion 36 and closes the lower end the inner body 22, to define an upwardly opening interior cavity 40 of the inner body for holding a beverage therein when the beverage container 10 is in an upright position.

The outer body sidewall 30 has an upper sidewall portion 42, and a lower sidewall portion 44. The outer body end wall 32 is in fluid-tight engagement with a lower end portion of the lower sidewall portion 44 and closes the lower end the outer body 24, to define an upwardly opening interior cavity 46 of the outer body 24. The upper sidewall portion 42 of the outer body sidewall 30 terminates in an upper end 48 extending about the upper sidewall portion 42.

When fully assembled as shown in FIG. 1, the lower sidewall portion 36 of the inner body sidewall 26 is positioned inward of and within the outer body sidewall 30 of the outer body 24, with the outer body sidewall 30 extending fully about the lower sidewall portion 36 of the inner body sidewall, and with the shoulder sidewall portion 38 of the inner body sidewall 26 positioned above and adjacent to the upper end 48 of the upper sidewall portion 42 of the outer body sidewall 30. The shoulder sidewall portion 38 of the inner body sidewall 26 is rigidly and fixedly attached to the upper end 48 of the upper sidewall portion 42 of the outer body sidewall 30, and in fluid-tight engagement therewith. Therebelow, the outer body sidewall 30 is spaced outward of the inner body sidewall 26 to define a first interior space between the outer and inner body sidewalls. The attachment together of the inner body sidewall 26 and the upper end 48 of the upper sidewall portion 42 is by welding, which fuses them together and forms a unitary structure. The upper sidewall portion 34 of the inner body sidewall 26 extends upward beyond the upper end 48 of the upper sidewall portion 42 of the outer body sidewall 30, with the upper sidewall portion 34 of the inner body sidewall 26 in alignment with the upper sidewall portion 42 of the outer body sidewall 30.

The inner body end wall 28 is spaced apart from and above the outer body end wall 32, to define a second interior space or gap 52 therebetween, with the inner body end wall 28 out of direct contact with the outer body end wall 32. The lower sidewall portion 44 of the outer body sidewall 30 has a side vent aperture or hole 50, extending fully through the lower sidewall portion 44 of the outer body sidewall, and in fluid communication with the gap 52. The side vent hole 50 is located in the lower sidewall portion 44 at a height above the outer body end wall 32 and preferably below the inner body end wall 28.

Positioned interior of the interior cavity 46 of the outer body 24 in the gap 52 between the inner body end wall 28 and the outer body end wall 32 is a non-glass glue, resin or other suitable adhesive material 54 of sufficient amount to be in engagement with and adhere to both the inner body end wall 28 and the outer body end wall 32. This is unlike a conventional glass double-walled beverage container where the inner body end wall is detached from and out of contact with the outer body end wall, with an air space therebetween, and essentially the inner body end wall floats suspended air and is only supported by the rigid connection between the inner and outer bodies at the upper ends thereof, often accomplished by welding which fuses together the upper portions of the inner and outer bodies. The use of the adhesive material 54 as described acts as a stabilizer. The adhesive material 54 increases the connection between the inner and outer bodies 22 and 24 to reduce stress on the joint joining the shoulder sidewall portion 38 of the inner body sidewall 26 to the upper end 48 of the upper sidewall portion 42 of the outer body sidewall 30, and preferably also by serving as a shock absorber during an impact. The adhesive material 54 is selected for its ability to handle more vibration better than glass, and to avoid using a direct glass-to-glass connection between the inner and outer body end walls 28 and 32. The result is a construction of a glass double-walled beverage container that greatly increases its ability to withstand breakage from impact stress, which is a particular problem with conventional glass double-walled beverage containers where the inner body end wall is detached from and out of contact with the outer body end wall, with an air space therebetween, and essentially the inner body end wall floats suspended air, as noted above, and is very vulnerable to breakage.

As will be described below, the method of forming the glass double-walled beverage container 10 of FIG. 1 uses the side vent hole 50 as an injection aperture and is sized to permit injection of the adhesive material 54 while in a fluid state into the gap 52. The adhesive material 54 is selected to have a fluidity that permits it to be injected into the gap 52 through the side vent hold 50 and then harden/cure within the gap.

It is noted that while the inner body sidewall 26 and the outer body sidewall 30 are described as being circular in cross-section, other shapes may be used for the inner body 22 and outer body 24. Similarly, while the inner body end wall 28 and the outer body end wall 32 are generally circular in shape, they may have other shapes that conform, respectively, to the shapes of the lower end portions of the lower sidewall portion 36 of the inner body sidewall 26 and the lower sidewall portion 44 of the outer body sidewall 30.

FIGS. 7 and 8 show an alternative embodiment of the glass double-walled beverage container 10' with a different construction for the glass inner and outer bodies 22' and 24'. In this alternative embodiment the inner body sidewall 26' has an upper sidewall portion 34' and a lower sidewall portion 36', and a flange sidewall portion 56' extending laterally at an upper end portion of the upper sidewall portion 34'. The flange sidewall portion 56' extend about the upper end portion of the upper sidewall portion 34'.

The outer body sidewall 30' has an upper sidewall portion 42', a lower sidewall portion 44, and a shoulder sidewall portion 58' extending laterally at a location between a lower end portion of the upper sidewall portion 42' and an upper end portion of the lower sidewall portion 44.

When the glass inner and outer bodies 22' and 24' are assembled together, as shown in FIG. 7, the inner body sidewall 26' is positioned inward of and within the outer body sidewall 30', with the flange sidewall portion 56' of the inner body sidewall 26' positioned above and adjacent to the shoulder sidewall portion 58' of the outer body sidewall 30'. The flange sidewall portion 56' of the inner body sidewall 26' is rigidly and fixedly attached to the shoulder sidewall portion 58' of the outer body sidewall 30', and in fluid-tight engagement therewith. The attachment together of the flange sidewall portion 56' and the shoulder sidewall portion 58' is by welding which fuses them together as shown in FIG. 8. The upper sidewall portion 42' of the outer body sidewall 30' extends upward beyond the flange sidewall portion 56' of the inner body sidewall 26'.

In the alternative embodiment of FIGS. 7 and 8, a bottom vent hole 50', located in the outer body end wall 32, extending fully through the outer body end wall, is used to inject the adhesive material 54 into the gap 52.

The method of forming the glass double-walled beverage container 10 of FIG. 1 will now be described.

Figure 2:
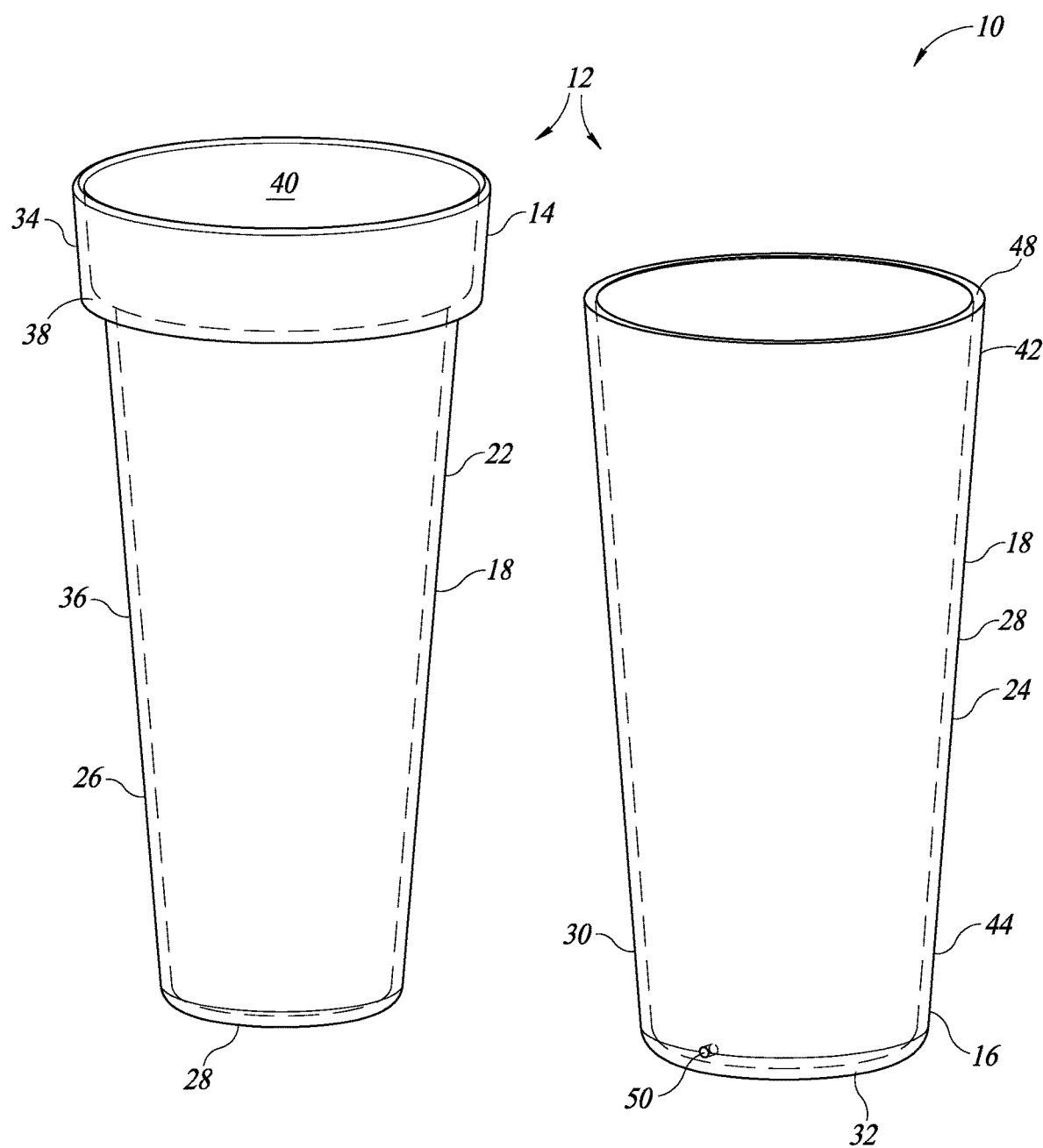
FIG. 2 is a perspective view of a glass inner shell and a glass outer shell, prior to being assembled to form the glass double-walled beverage container of FIG. 1.
Figure 3:
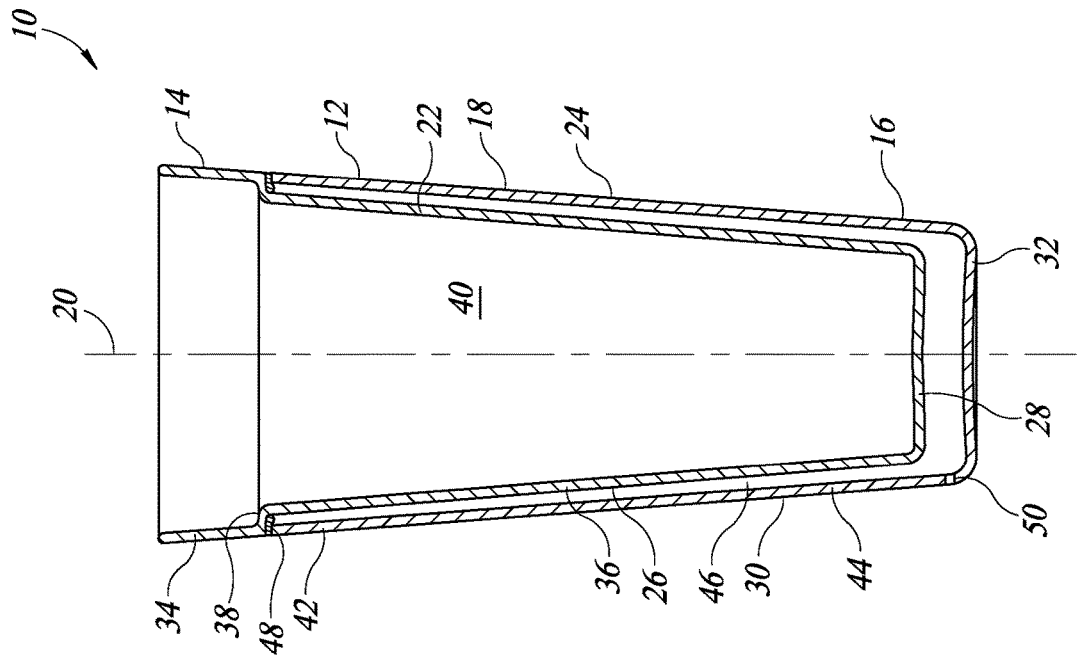
FIG. 3 is a side elevational, cross-sectional view of the glass inner shell partially positioned within the glass outer shell in accordance with a method of forming the glass double-wall beverage container of FIG. 1.

The inner body 22 and the outer body 24 are manufactured of glass as separate components (see FIG. 2). The inner body 22 is positioned within the outer body 24, with the shoulder sidewall portion 38 of the inner body sidewall 26 positioned above and adjacent to the upper end 48 of the upper sidewall portion 42 of the outer body sidewall 30 (see FIG. 3). The shoulder sidewall portion 38 of the inner body sidewall 26 is next rigidly and fixedly attached to the upper end 48 of the upper sidewall portion 42 of the outer body sidewall 30, and in fluid-tight engagement therewith, by welding, which fuses them together and forms the unitary structure (see FIGS. 4 and 5). The assembled inner and outer bodies 22 and 24 are then placed in an annealing oven. After their removal from the oven and the inner and outer bodies 22 and 24 cooling down, but prior to sealing the side vent hole 50, the adhesive material 54 while in a fluid state is injected through the side vent hole 50 into the gap 52 (see FIG. 6). Sufficient adhesive material 54 is injected to be in engagement with and adhere to both the inner body end wall 28 and the outer body end wall 32. Preferably, the adhesive material 54 extends across and adheres to the full area of the downward facing inner body end wall 28 and the full area of the upward facing outer body end wall 32. The side vent hole 50 is then sealed from the outside using a different type of adhesive material or a suitable alternative material to form a plug 60.

The adhesive material 54 is selected based on its flexibility so it can help absorb normal vibration as well as allow it to flex with the temperature changes normally encountered with the beverage container 10 holds hot beverages and is subject to hot water and steam during dishwashing. Silicone based glue is preferred. The adhesive material used to form the plug 60 is a hard rigid glue that can handle harsh environmental abuse.

A similar process is used with the alternative embodiment of FIGS. 7 and 8, except the adhesive material 54 is injected through the bottom vent hold 50'.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood with the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B, and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context.

Accordingly, the invention is not limited except as by the appended claims.

The invention claimed is:

1. A glass double-walled beverage container for holding a beverage, comprising:
    a glass inner body with an inner body sidewall and an inner body end wall, the inner body sidewall having an inner body sidewall upper end portion and an inner body sidewall lower end portion, the inner body sidewall lower end portion being in fluid-tight engagement with the inner body end wall to define an upwardly opening interior cavity for holding the beverage therein;
    a glass outer body with an outer body sidewall and an outer body end wall, the outer body sidewall extending fully about the inner body sidewall, the outer body sidewall having an outer body sidewall upper end portion and an outer body sidewall lower end portion, the outer body sidewall lower end portion being in fluid-tight engagement with the outer body end wall, the inner body sidewall upper end portion and the outer body sidewall upper end portion being rigidly connected together and in fluid-tight engagement, and therebelow the outer body sidewall being spaced outward of the inner body sidewall to define a first interior space between the outer and inner body sidewalls, the inner body end wall being positioned above and spaced apart from the outer body end wall to provide a second interior space between the inner and outer body end walls; and
    a non-glass adhesive material positioned in the second interior space in engagement with and adhered to both the inner and outer body end walls.

2. The glass double-walled beverage container of claim 1, wherein the outer body sidewall has an injection aperture extending fully therethrough sized to permit injection of the non-glass adhesive material therethrough and into the second interior space while the adhesive material is in a fluid state.

3. The glass double-walled beverage container of claim 2, wherein the injection aperture is located in the outer body sidewall lower end portion.

4. The glass double-walled beverage container of claim 3, wherein the injection aperture is located in the outer body sidewall lower end portion at a location above the outer body end wall and below the inner body end wall.

5. The glass double-walled beverage container of claim 1, wherein the outer body end wall has an injection aperture extending fully therethrough sized to permit injection of the non-glass adhesive material therethrough and into the second interior space while the adhesive material is in a fluid state.

6. The glass double-walled beverage container of claim 1, wherein the inner body sidewall upper end portion and the outer body sidewall upper end portion are rigidly connected together by welding.

7. The glass double-walled beverage container of claim 1, wherein the inner body sidewall upper end portion and the outer body sidewall upper end portion are fused together such that the inner and outer bodies together form a unitary structure.

8. The glass double-walled beverage container of claim 1, wherein the adhesive material is a glue.

9. The glass double-walled beverage container of claim 1, wherein the adhesive material is a silicone based glue.

10. A double-walled container, comprising:
an inner body with an inner body sidewall and an inner body end wall, the inner body sidewall having an inner body sidewall upper end portion and an inner body sidewall lower end portion, the inner body sidewall lower end portion being in fluid-tight engagement with the inner body end wall to define an upwardly opening interior cavity;
an outer body with an outer body sidewall and an outer body end wall, the outer body sidewall extending fully about the inner body sidewall, the outer body sidewall having an outer body sidewall upper end portion and an outer body sidewall lower end portion, the outer body sidewall lower end portion being in fluid-tight engagement with the outer body end wall, the inner body sidewall upper end portion and the outer body sidewall upper end portion being rigidly connected together and in fluid-tight engagement, and therebelow the outer body sidewall being spaced outward of the inner body sidewall to define a first interior space between the outer and inner body sidewalls, the inner body end wall being positioned above and spaced apart from the outer body end wall to provide a second interior space between the inner and outer body end walls; and
an adhesive material positioned in the second interior space in engagement with and adhered to both the inner and outer body end walls.

11. The double-walled container of claim 10, wherein the outer body sidewall has an injection aperture extending fully therethrough sized to permit injection of the non-glass adhesive material therethrough and into the second interior space while the adhesive material is in a fluid state.

12. The double-walled container of claim 11, wherein the injection aperture is located in the outer body sidewall lower end portion.

13. The double-walled container of claim 12, wherein the injection aperture is located in the outer body sidewall lower end portion at a location above the outer body end wall and below the inner body end wall.

14. The double-walled container of claim 10, wherein the outer body end wall has an injection aperture extending fully therethrough sized to permit injection of the non-glass adhesive material therethrough and into the second interior space while the adhesive material is in a fluid state.

15. The double-walled container of claim 10, wherein the adhesive material is a glue.

16. The double-walled container of claim 10, wherein the adhesive material is a silicone based glue.

17. A method of forming a glass double-walled beverage container, comprising:
forming a glass inner body with an inner body sidewall and an inner body end wall, the inner body sidewall having an inner body sidewall upper end portion and an inner body sidewall lower end portion, the inner body sidewall lower end portion being in fluid-tight engagement with the inner body end wall to define an upwardly opening interior cavity for holding a beverage therein;
forming a glass outer body with an outer body sidewall and an outer body end wall, the outer body sidewall having an outer body sidewall upper end portion and an outer body sidewall lower end portion, the outer body sidewall lower end portion being in fluid-tight engagement with the outer body end wall;
positioning the inner body within the outer body with the outer body sidewall extending fully about the inner body sidewall;
rigidly connecting together the inner body sidewall upper end portion and the outer body sidewall upper end portion, with the outer body sidewall being spaced outward of the inner body sidewall to define a first interior space between the outer and inner body sidewalls, and with the inner body end wall positioned above and spaced apart from the outer body end wall to provide a second interior space between the inner and outer body end walls;
forming an injection aperture extending fully through one of the outer body sidewall and the outer body end wall in fluid communication with the second interior space and sized to permit injection of a non-glass adhesive material therethrough and into the second interior space while the adhesive material is in a fluid state; and
injecting a sufficient quantity of a non-glass adhesive material through the injection aperture and into the second interior space such that the adhesive material is in engagement with and adhered to both the inner and outer body end walls.

18. The method of claim 17, wherein the injection aperture is formed in the outer body sidewall lower end portion.

19. The method of clam 18, wherein the injection aperture is formed in the outer body sidewall lower end portion at a location above the outer body end wall and below the inner body end wall.

20. The method of clam 17, wherein the inner body sidewall upper end portion and the outer body sidewall upper end portion are rigidly connected together by welding.

21. The method of clam 17, wherein the inner body sidewall upper end portion and the outer body sidewall upper end portion are rigidly connected together by fusing them together such that the inner and outer bodies together form a unitary structure.

22. The method of claim 17, wherein the adhesive material is a glue.

23. The method of claim 17, wherein the adhesive material is a silicone based glue.

\* \* \* \* \*